(12) United States Patent
Weksler et al.

(10) Patent No.: US 7,586,739 B2
(45) Date of Patent: Sep. 8, 2009

(54) ARRANGEMENTS FOR AVERTING FLAT PANEL DISPLAY DAMAGE

(75) Inventors: Arnold S. Weksler, Raleigh, NC (US); Scott E. Kelso, Durham, NC (US); John C. Mese, Cary, NC (US); Nathan J. Peterson, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 11/461,433

(22) Filed: Jul. 31, 2006

(65) Prior Publication Data

US 2008/0024963 A1    Jan. 31, 2008

(51) Int. Cl.
*G06F 1/16* (2006.01)
*H05K 5/00* (2006.01)
*H05K 7/00* (2006.01)

(52) U.S. Cl. .............................. 361/679.26; 361/679.21

(58) Field of Classification Search ................. 361/681, 361/683, 679.21, 679.26
See application file for complete search history.

(56) References Cited

U.S. PATENT DOCUMENTS

| | | | | |
|---|---|---|---|---|
| 3,842,930 A * | 10/1974 | Fiala | ............................ | 280/735 |
| 4,027,953 A | 6/1977 | Jacob | | |
| 6,294,995 B1 * | 9/2001 | Patterson | ..................... | 340/571 |
| 7,028,954 B2 * | 4/2006 | Van Dam et al. | ............. | 244/204 |
| 7,106,580 B2 * | 9/2006 | Kugimiya et al. | ............ | 361/683 |
| 7,252,313 B2 * | 8/2007 | Browne et al. | ............... | 293/128 |
| 2003/0179543 A1 * | 9/2003 | Sri-Jayantha et al. | ........ | 361/683 |
| 2004/0261411 A1 * | 12/2004 | MacGregor | ................... | 60/527 |
| 2006/0125291 A1 * | 6/2006 | Buravalla et al. | ............ | 296/204 |
| 2007/0171207 A1 * | 7/2007 | Wernersson | ................. | 345/169 |
| 2007/0257410 A1 * | 11/2007 | Toh et al. | ..................... | 267/153 |

FOREIGN PATENT DOCUMENTS

WO    WO-00/25164    5/2000

OTHER PUBLICATIONS

Introduction to Flexinol, Dynalloy, Inc., http://www.dynalloy.com/AboutFlexinol.html.

* cited by examiner

*Primary Examiner*—Jayprakash N Gandhi
*Assistant Examiner*—Adrian S Wilson
(74) *Attorney, Agent, or Firm*—Ference & Associates LLC

(57) ABSTRACT

An arrangement for supporting a flat panel display wherein an actuating arrangement responsively alters a physical disposition of the supporting arrangement in a manner to avert physical damage to said flat panel display. Preferably, a flat panel display cover on a laptop will "bow" or arch in a direction away from the flat panel display and the actuating arrangement can be embodied, e.g., by a lattice or grid of wiring, or by a bimetallic sheet. Electronic or mechanical actuation is conceivable and the actuating arrangement can be triggered by, e.g., the imposition of a potentially damaging object and/or by closure of the laptop. While a laptop embodiment is broadly contemplated, other applications are possible.

18 Claims, 1 Drawing Sheet

ARRANGEMENTS FOR AVERTING FLAT PANEL DISPLAY DAMAGE

FIELD OF THE INVENTION

The present invention relates generally to flat panel displays, such as found on laptop computers, and arrangements for supporting and protecting the same.

BACKGROUND OF THE INVENTION

Flat panel displays are utilized in a variety of settings including, but by no means limited to, laptop or notebook computers. ("Laptop" and "notebook" are terms which may be construed interchangeably herein.) Essentially, in a laptop or notebook, flat panel displays (particularly LCD display screens) are supported by a hinged cover which supports and holds the flat panel display, while a lower hinged cover supports a keyboard and/or other components.

If the laptop is in a "closed" position, with the upper and lower hinged covers disposed adjacent one another and (usually) "locked" or held essentially immobile with respect to one another, it is often the case that pressure applied to the external surfaces of the laptop can cause damage to components internal thereto. Most particularly, pressure applied to a rear portion of an "upper cover" (or "flat panel cover", i.e., that cover which supports/holds a flat panel screen), i.e., that portion disposed externally when the laptop is in a closed position, can often damage or break the flat panel screen.

Some conventional solutions to this very common problem have involved making the flat panel cover thicker or more bulky, or by increasing a clearance between the back of the display (or screen) itself and an inner surface of the cover. However, added bulk is common to all these solutions, which is completely incompatible with recent trends (guided largely by consumer preferences) towards thinner and lighter laptops.

Accordingly, a compelling need has been recognized in connection with providing solutions to the ongoing challenge of minimizing the risk of damage to flat panel display screens but in a manner to avoid the disadvantages of prior solutions.

SUMMARY OF THE INVENTION

In accordance with at least one presently preferred embodiment of the present invention, there is broadly contemplated herein an arrangement for supporting a flat panel display wherein an actuating arrangement responsively alters a physical disposition of the supporting arrangement in a manner to avert physical damage to said flat panel display. Preferably, a display cover on a laptop will "bow" or arch in a direction away from the flat panel display and the actuating arrangement can be embodied, e.g., by a lattice or grid of wiring, or by a bimetallic sheet. Electronic or mechanical actuation is conceivable and the actuating arrangement can be triggered by, e.g., the imposition of a potentially damaging object and/or by closure of the laptop. While a laptop embodiment is broadly contemplated, other applications are possible.

In summary, one aspect of the invention provides an arrangement comprising: a flat panel display; an arrangement for supporting said flat panel display; said supporting arrangement acting to support said flat panel display in a manner to facilitate viewing of one or more images in said flat panel display; said supporting arrangement comprising a front portion substantially coincident with said flat panel display and a rear portion disposed adjacent said flat panel display; and an actuating arrangement which responsively alters a physical disposition of said supporting arrangement in a manner to avert physical damage to said flat panel display.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
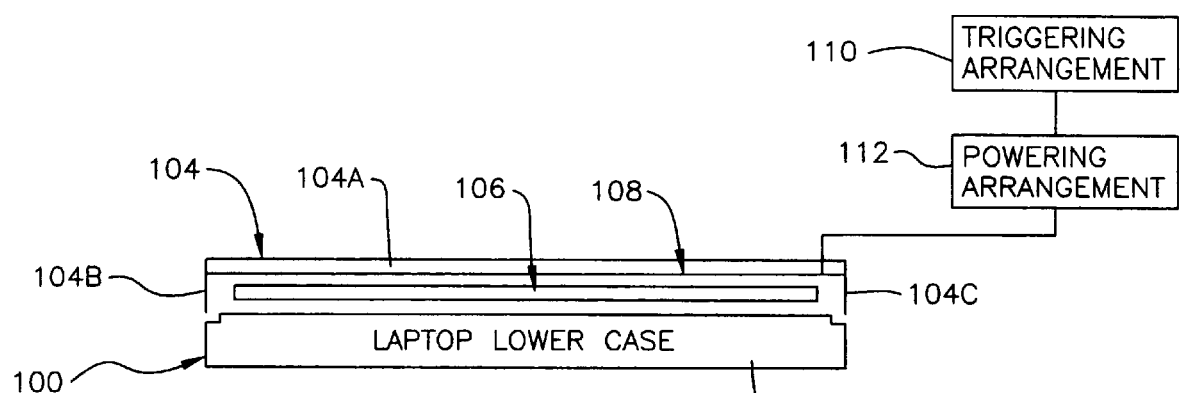
FIG. 1 schematically illustrates a laptop in a first configuration.

As shown in FIG. 1, a laptop 100 may include a lower cover or case 102, hingedly attached in known manner to an upper cover (or "display cover") 104. A front portion of this cover 104 is essentially coincident with a flat panel display 106, while a rear portion 104a of the cover 104 faces away from the flat panel display 106 and is exposed on an external side thereof to any and all mechanical perturbations that may be applied to the cover 104.

Figure 2:
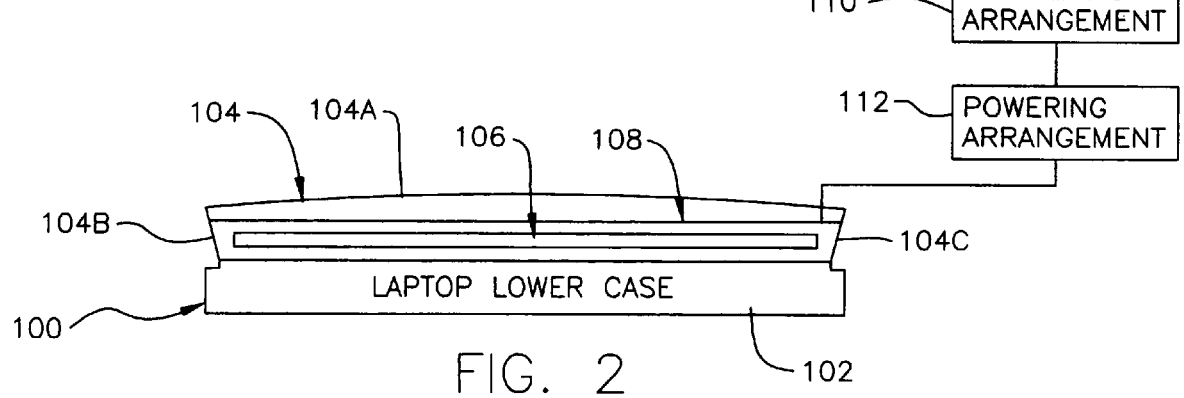
FIG. 2 schematically illustrates a laptop in a second configuration.

Preferably included, in accordance with a preferred embodiment of the present invention, is an arching arrangement 108. Broadly stated, a triggering arrangement 110 will preferably prompt a powering arrangement 110 to activate the arching arrangement 108 to cause a bowing or arching of rear portion 104a, with the result of providing a greater clearance between rear portion 104a and flat panel display 106, to avert physical damage to display 106. This may be accomplished by drawing opposing edges 104b/104c of cover 104 will be drawn towards one another, resulting essentially in a configuration such as that shown in FIG. 2, or by alternative arrangements as discussed below. It will be appreciated that any force then being applied to cover 104 will not be directed to flat panel display 106 but will travel down the "arch" that is formed. Preferably, display 106 will be inset slightly from edges 104b/c so that when rear portion 104a of cover 104 does bow, there will still be some clearance between screen 106 and edges 104b/c.

Arching arrangement 108 may be embodied, e.g., by a series of "Flexinol wires" or "muscle wires". Flexinol wires are a shape memory alloy actuator wire maunfactured by Dynalloy, Inc.; made of nickel-titanium, they contract when electrically driven. Essentially, these wires could be anchored to edge or side portions 104b/104c of cover 104.

The wires could initially be in a relaxed state in accordance with FIG. 1. Here, triggering arrangement 110 can preferably be embodied by a strain gauge or touch pad sensor that would detect imminent damage (e.g., from an approaching object or an object already impinging upon the cover 104). Such an "imminent damage detector" is described in more detail in the previously filed and commonly assigned U.S. Pat. No. 7,197, 406, of which is herein incorporated by reference. Powering arrangement 112 could preferably be embodied here by a high-current power source (e.g. a capacitor bank). Upon detecting imminent damage, the detector (at 110) would prompt current source (at 112) to apply current to the wires (108) so that they contract and pull sides 104b/c towards each other. Preferably, after a predetermined period of time, the detector (at 110) would prompt the current source (at 112) to power down so that the wires (108) slack again.

By way of another embodiment, a stamped, patterned sheet could be used in place of muscle wires at 108, with a foil heater laminated thereto. Upon detection of a pending crush or contact from an external object (via e.g., an imminent damage detector as just described), the foil heater could be prompted to heat up, which in turn would cause cover 104 to arch or bow. The foil heater could thus be considered to be the "powering arrangement" 112.

By way of yet another embodiment, pulling arrangement 108 could be embodied by a lattice or grid of low-elasticity wires such as fiberglas or carbon fiber wires. In such an embodiment, it is presently preferred that these wires would be under constant tension, the back cover would thereby be bowed out, and the system would be passively protected.

By way of another alternative embodiment, a grid or lattice of low-elasticity wires or cords could be provided at 108 as just described. However, rather than keeping the cords always under tension, a suitable lever and latch mechanism could be provided on the cover 104 to permit the cords to be left slack when cover 104 is in an "open" position. In a "closed" position, in contrast, the lever mechanism could activate to put the cords in a tensioned state and thus arch or bow cover 104 as described above. The lever could thus be engaged manually or automatically when the laptop 100 is closed and disengaged manually or automatically when the laptop 100 is opened. In this respect, the lever mechanism could be thought of as the triggering arrangement 110, and its functional connection with the cords as the powering arrangement 112.

While embodiments of the present invention have been discussed herein in the context of laptops, it should be appreciated that other applications are possible. Such other applications, include, but are not limited to, personal digital assistants (PDAs), cellular telephones, portable MP3 players, or any other device with a flat panel display that is relatively thin.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An arrangement comprising:
    a flat panel display;
    a support arrangement that supports the flat panel display;
    a triggering arrangement comprising a detector;
    a powering arrangement; and
    an arching arrangement;
    wherein the triggering arrangement is adapted to prompt the powering arrangement upon detecting imminent danger via the detector;
    wherein the powering arrangement is adapted to activate the arching arrangement; and
    wherein the arching arrangement is adapted to arch a portion of the support arrangement away from the flat panel display upon being activated.

2. The arrangement according to claim 1, wherein the detector comprises a strain gauge;
    wherein the arching arrangement comprises muscle wires that contract;
    wherein, upon detecting imminent danger, the triggering arrangement is adapted to prompt a power source to supply a current to the arching arrangement to cause the muscle wires to contract; and
    wherein, after a predetermined period of time, the triggering arrangement is adapted to prompt the power source to power down.

3. An arrangement comprising:
    a flat panel display;
    an arrangement for supporting said flat panel display;
    said supporting arrangement acting to support said flat panel display in a manner to facilitate viewing of one or more images in said flat panel display;
    said supporting arrangement comprising a front portion substantially coincident with said flat panel display and a rear portion disposed adjacent said flat panel display; and
    an actuating arrangement which responsively alters a physical disposition of said supporting arrangement in a manner to avert physical damage to said flat panel display;
    wherein said actuating arrangement acts to alter a physical disposition of said supporting arrangement responsive to a prospective or current physical impact upon said supporting arrangement; and
    wherein:
    said rear portion of said supporting arrangement comprises a pair of edges disposed opposite one another with respect to a linear dimension of said supporting arrangement; and
    said actuating arrangement acts to draw said edges towards one another and impart a bowed disposition to said rear portion of said supporting arrangement.

4. The arrangement according to claim 3, wherein said actuating arrangement acts to alter a physical disposition of said supporting arrangement responsive to a prospective or current physical impact upon at least one of said flat panel display and said supporting arrangement.

5. The arrangement according to claim 3, wherein said actuating arrangement comprises muscle wires which contract responsive to an applied current.

6. The arrangement according to claim 5, wherein said actuating arrangement comprises:
    an arching arrangement which draws said edges towards one another; and
    a proximation detection arrangement which detects a proximate object and which prompts said arching arrangement to draw said edges towards one another.

7. The arrangement according to claim 3, wherein said actuating arrangement comprises wires formed from fiberglass or carbon fiber.

8. The arrangement according to claim 3, wherein said actuating arrangement comprises a metal sheet arrangement which acts to arch said rear portion of said supporting arrangement responsive to a temperature change.

9. The arrangement according to claim 8, wherein said actuating arrangement further comprises a foil heater attached to said metal sheet arrangement, said foil heater acting to heat said metal sheet arrangement to arch said rear portion of said supporting arrangement.

10. The arrangement according to claim 3, wherein said supporting arrangement comprises a laptop cover.

11. The arrangement according to claim 10, wherein said actuating arrangement acts to alter a physical disposition of said laptop cover responsive to an opening or closing of said laptop cover.

12. The arrangement according to claim 11, wherein:
said rear portion of said supporting arrangement comprises a pair of edges disposed opposite one another with respect to a linear dimension of said supporting arrangement; and
said actuating arrangement acts to draw said edges towards one another and impart a bowed disposition to said rear portion of said supporting arrangement.

13. The arrangement according to claim 11, wherein said actuating arrangement comprises:
a wire arrangement which acts to draw said edges towards one another; and
a lever arrangement which, responsive to closure of said laptop cover, acts to tension said wire arrangement to draw said edges towards one another.

14. The arrangement according to claim 3, wherein said flat panel display is an LCD screen.

15. The arrangement according to claim 3, wherein said flat panel display is an inflexible, flat panel display.

16. The arrangement according to claim 3, wherein said flat panel display is glass-based.

17. The arrangement according to claim 6, further comprising a notifying arrangement which notifies when said arching arrangement has been prompted to draw said edges towards one another.

18. The arrangement according to claim 17, wherein said notifying arrangement is an audible alarm.

* * * * *

UNITED STATES PATENT AND TRADEMARK OFFICE
CERTIFICATE OF CORRECTION

PATENT NO. : 7,586,739 B2
APPLICATION NO. : 11/461433
DATED : September 8, 2009
INVENTOR(S) : Weksler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Twenty-first Day of September, 2010

David J. Kappos
*Director of the United States Patent and Trademark Office*